United States Patent
Schlegel et al.

(10) Patent No.: US 11,231,935 B2
(45) Date of Patent: Jan. 25, 2022

(54) VECTORIZED SORTED-SET INTERSECTION USING CONFLICT-DETECTION SIMD INSTRUCTIONS

(71) Applicant: Oracle International Corporation, Redwood Shores, CA (US)

(72) Inventors: Benjamin Schlegel, Merced, CA (US); Pit Fender, Union City, CA (US); Matthias Brantner, Sunnyvale, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/846,773

(22) Filed: Apr. 13, 2020

(65) Prior Publication Data

US 2021/0318886 A1     Oct. 14, 2021

(51) Int. Cl.
*G06F 9/38* (2018.01)
*G06F 7/16* (2006.01)
*G06F 9/30* (2018.01)

(52) U.S. Cl.
CPC .............. *G06F 9/3887* (2013.01); *G06F 7/16* (2013.01); *G06F 9/30098* (2013.01)

(58) Field of Classification Search
None
See application file for complete search history.

(56) References Cited

U.S. PATENT DOCUMENTS

| | | | |
|---|---|---|---|
| 2012/0158774 A1* | 6/2012 | Balkesen | G06F 17/10 707/769 |
| 2015/0186471 A1* | 7/2015 | Yammahi | G06F 16/2468 707/780 |
| 2017/0168827 A1* | 6/2017 | Mishra | G06F 9/30029 |

OTHER PUBLICATIONS

Inoue, H. et.al., Faster Set Instruction with SIMD Instructions by Reducing Branch Mispredictions, 2014, Proceedings of the VLDB Endowment vol. 8, No. 3. pp. 293-304. (Year: 2014).*
Schlegel, B. et.al., Fast Sorted-Set Intersection using SIMD Instructions, 2011, The second Intl. Workshop on Accelerating Data Management Systems using Modern Processor and Storage Architectures (ADMS '11), 9 pages. (Year: 2011).*
Han, S. et.al., Speeding Up Set Intersections in Graph Algorithms using SIMD Instructions, ACM, 2018, pp. 1587-1602. (Year: 2018).*
Davidson, A et.al., Efficient Parallel Merge Sort for Fixed and Variable Length Keys, 2012, IEEE, 9 pages. (Year: 2012).*

(Continued)

*Primary Examiner* — Eric Coleman
(74) *Attorney, Agent, or Firm* — Hickman Becker Bingham Ledesma LLP

(57) ABSTRACT

Vectorized sorted-set intersection is performed using conflict-detection single instruction, multiple data (SIMD) instructions. A first ordered subset of values of a first ordered set of distinct values and a second ordered subset of values of a second ordered set of distinct values is loaded into a register. A first value in the register that matches another value in the register (i.e., common values) is identified by performing an SIMD instruction. The first value is then stored in a result set representing a merge-sort result set between the first ordered set of distinct values and the second ordered set of distinct values.

20 Claims, 9 Drawing Sheets

(56) References Cited

OTHER PUBLICATIONS

Jiang, P., et.al., Conflict-Free Vectorization of Associative Irregular Applications with Recent SIMD Architectural Advances, 2018, ACM, (Year: 2018).*

Song, X., et. al., Software Optimizations of Multiple Sets Intersection via SIMD Instructions,. 2017,IEEE, pp. 558-563. (Year: 2017).*

Ungethum et al., "Conflict Detection-based Run-Length Encoding-AVX-512 cd Instruction Set in Action", In 2018 IEEE 34th International Conference on Data Engineering Workshops (ICDEW). pages 96-101. IEEE, 2018.

Pietrzyk et al., "Fighting the Duplicates in Hashing: Conflict Detection-aware Vectorization of Linear Probing", BTW 2019, 2019.

Lemire et al., "SIMD Compression and the Intersection of Sorted Integers", Software: Practice and Experience, 46(6):723-749, 2016.

Lemire et ai., "Roaring Bitmaps: Implementation of an Optimized Software Library", Software: Practice and Experience, 48(4):867-895, 2018.

Arnold et al., "An Application-Specific Instruction Set for Accelerating Set-Oriented Database Primitives", In Proceedings of the 2014 ACM SIGMOD International Conference on Management of Data, pp. 767-778. ACM, 2014.

\* cited by examiner

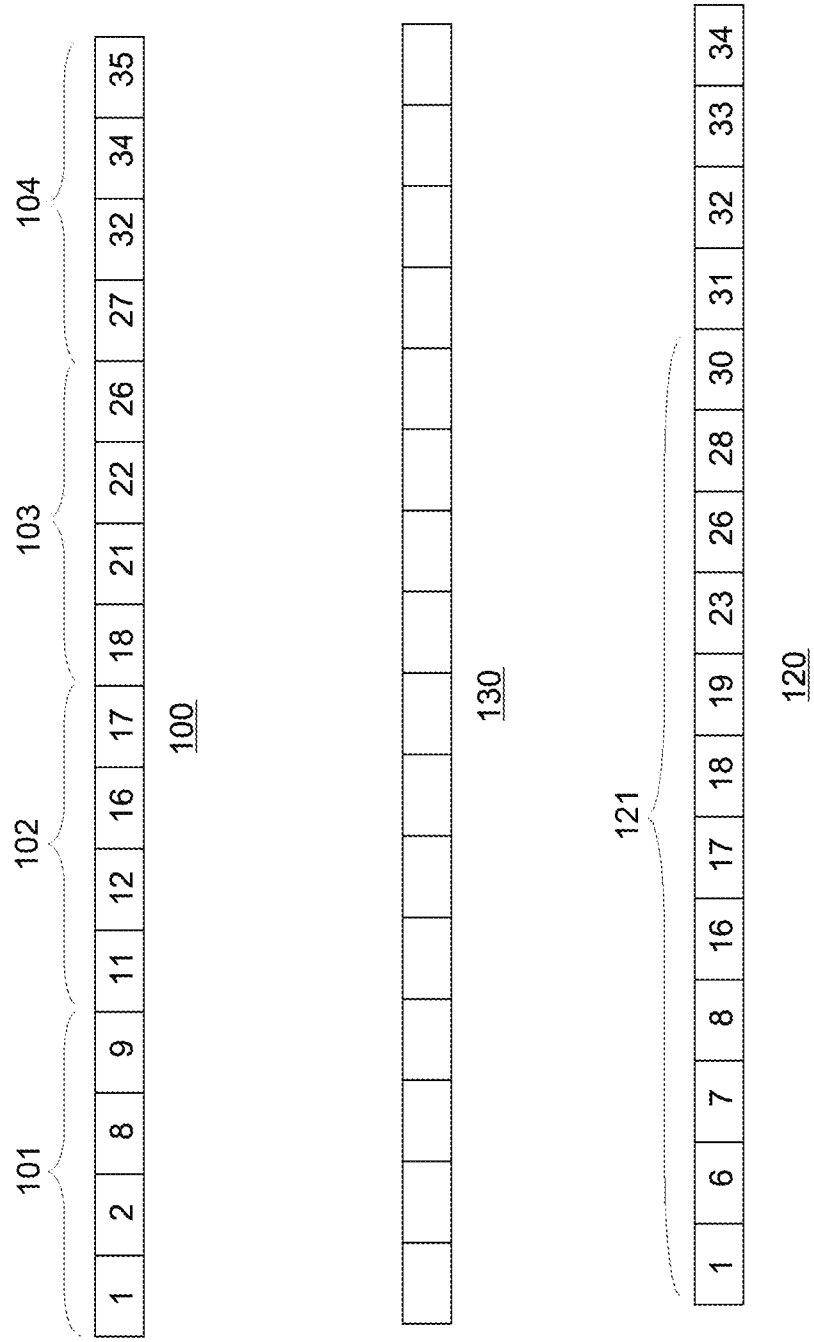

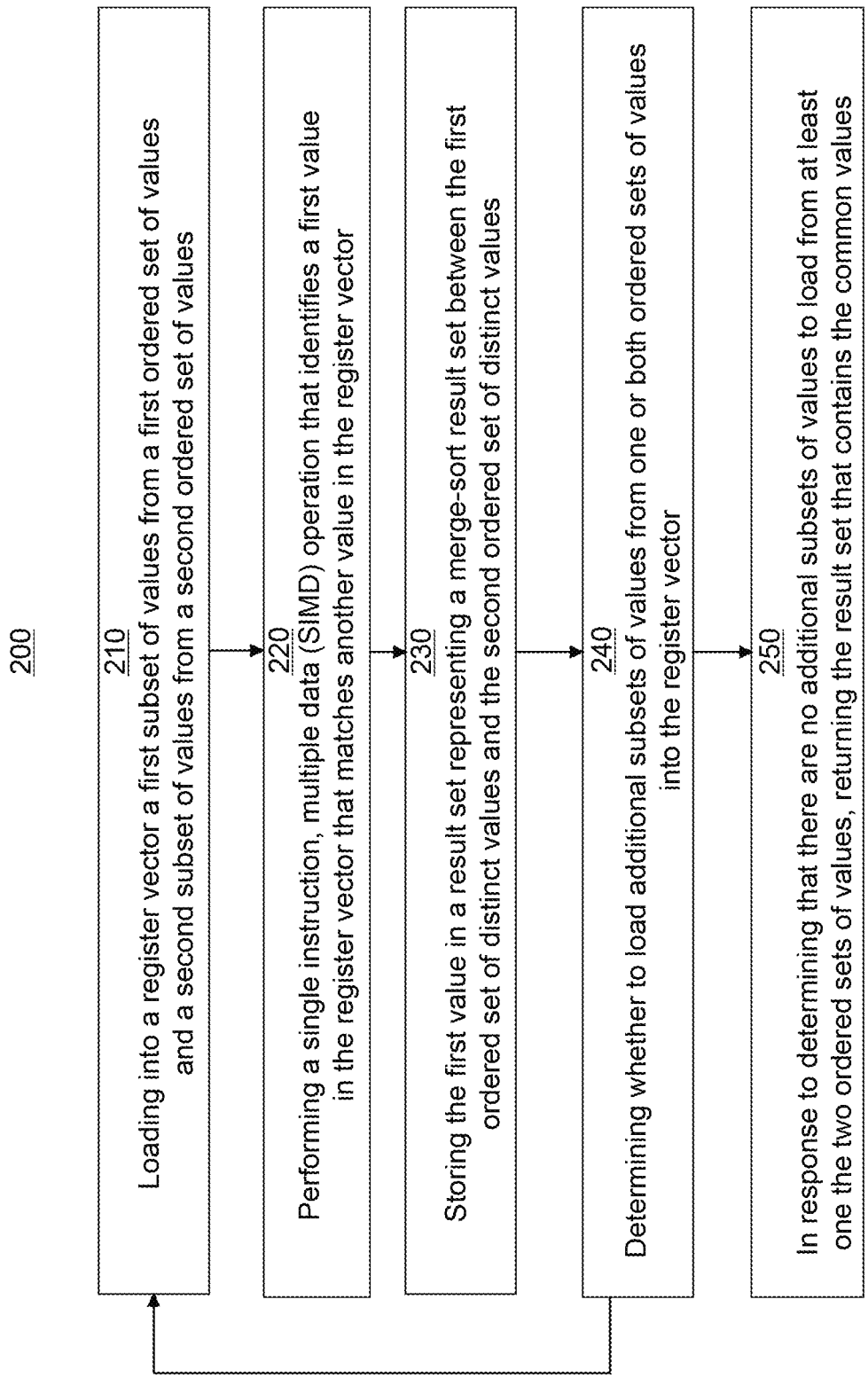

VECTORIZED SORTED-SET INTERSECTION USING CONFLICT-DETECTION SIMD INSTRUCTIONS

FIELD OF THE INVENTION

The present disclosure relates to efficiently determining intersection between sets of data or values.

BACKGROUND

Sorted-set intersection is a fundamental operation in query processing in the area of databases and information retrieval. It is part of many algorithms and often accounts for a large fraction of the overall runtime. Examples of algorithms utilize sorted-set intersection include inverted indexes in information retrieval, intersecting document ID lists for multi-keyword search in search engines, lists intersection in frequent-itemset mining, and merging of record identifier (RID) lists in database query processing.

In many of these application areas, low latencies are a key concern, thus, reducing the execution time of sorted-set intersection is crucial. Some approaches to reducing the execution time of sorted-set intersection, such as the scalar sorted-set intersection approach, focus on the speed up of sequential intersection by using efficient data structures or improved processing techniques. Other approaches focus on utilizing modern hardware like graphic processors units (GPUs) and multi-core central processing units (CPUs) to utilize the parallelism offered by these processors.

However, the above approaches mainly rely on thread-level parallelism which may have high implementation complexity and large overheads that offsets the benefit of fewer comparisons. Hence, there is a strong incentive to use data-level parallelism approaches, which have smaller overheads and lower implementation complexity, to speed up the intersection of sorted sets.

Discussed herein are approaches for speeding up the intersection of sorted sets by vectorizing them and utilizing conflict-detection Single Instruction, Multiple Data (SIMD) instructions for comparisons and shuffling or moving data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-1E illustrate a vectorized sorted-set intersection algorithm using conflict-detection SIMD instructions according to an embodiment of the present invention.

FIG. 2 illustrates a flow diagram that depicts a process for vectorized sorted-set intersection using conflict-detection SIMD instructions in an embodiment of the invention.

DETAILED DESCRIPTION

Figure 1B:
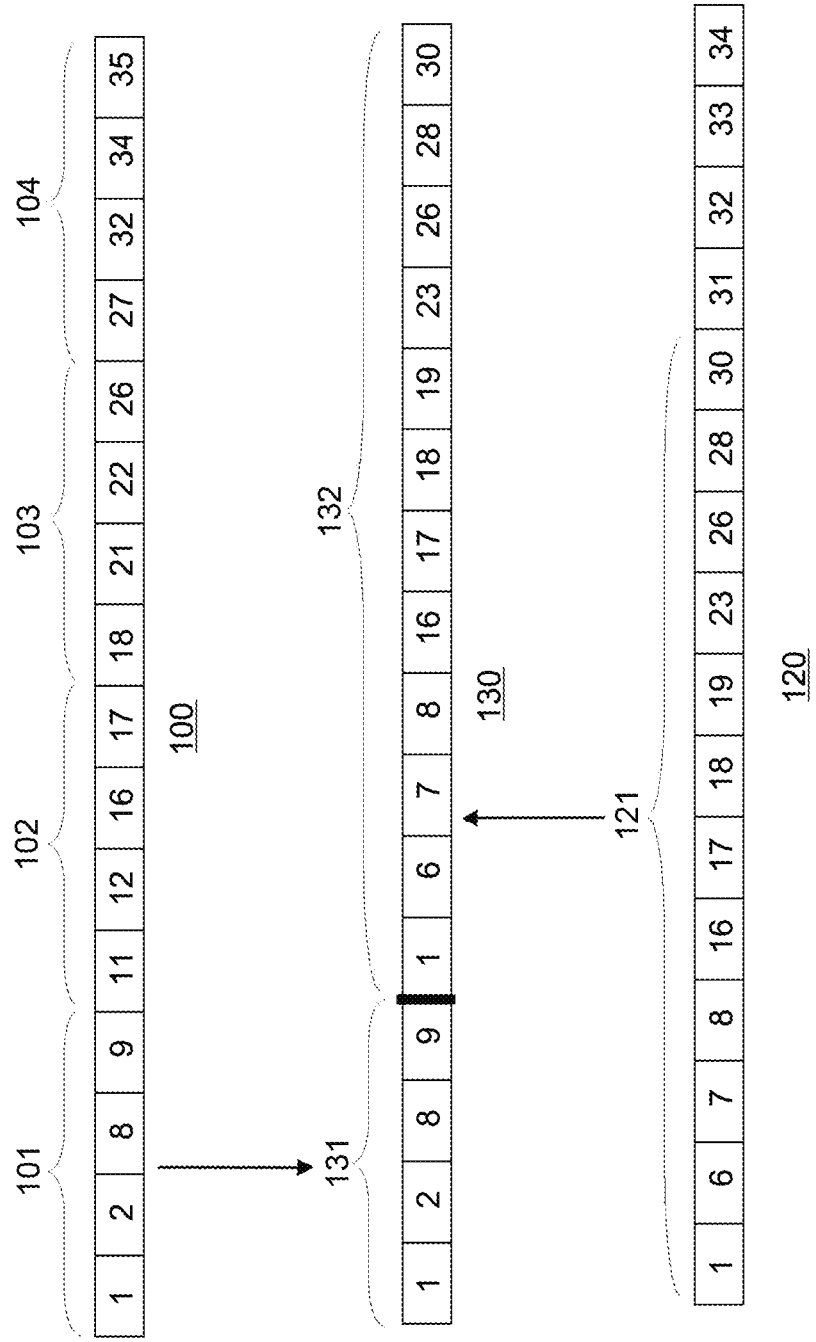

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Sorted-Set Intersection Overview

The intersection of two or more sets returns a set that contains all common elements from the two or more sets. For example, the intersection of set A {3, 1, 2, 0} and set B {4, 3, 5, 1, 2} results set C {1, 2, 3}, where '1', '2' and '3' are common elements from sets A and B. A sorted-set intersection is the intersection of two or more sets that are sorted (i.e., ordered). For example, the intersection of sorted set A {0, 1, 2, 3} and sorted set B {1, 2, 3, 4, 5} is a sorted-set intersection.

Algorithms that perform set intersections usually require iteratively comparing each value from the inputs sets and returning the values that are equal. Thus, many existing algorithms focus on reducing the number of comparisons to improve performance. The scalar sorted-set intersection approach is one such approach that tries to reduce the number of comparisons to improve sorted-set intersection performance.

Scalar Sorted-Set Intersection Algorithm Overview

A sorted-set intersection operation requires two or more duplicate-free sorted sets as inputs and outputs a sorted set that contains common values of the two or more input sets. A scalar sorted-set algorithm iteratively compares values taken from each input set, starting with the first value of each set.

TABLE 1

Pseudo code for an example scalar sorted-set intersection algorithm

```
int scalar_intersect(int *A, int *B, int 1_a, int 1_b, int* C) {
    int count = 0;
    int i_a = 0, i_b = 0;
    while(i_a < 1_a && i_b < 1_b) {
        if(A[i_a] == B[i_b]) {
            C[count++]=A[i_a];
            i_a++;
            i_b++;
        }
        else if (A[i_a] > B[i_b])
            i_b++;
        else
            i_a++;
    }
    return count;
}
```

Table 1 illustrates the pseudo code for an example scalar sorted-set intersection algorithm. The scalar_intersect( ) function takes five (5) arguments: A, B, 1_a, and 1_b. The arguments A and B represent two sorted sets. The arguments 1_a and 1_b specify the lengths of sorted set A and sorted set B, respectively. The argument C represents the result set that contains the common values from set A and set B. The scalar_intersect( ) function has a loop, which iteratively compares two values taken from each set, starting with the first value from each set, which are indexed via i_a and i_b, respectively. Whenever the two values, A[i_a] and B[i_b], are compared and determined to be equal, the value is written into the result set C and a counter, count,—that counts the number of common values—is incremented. Then, the indices i_a and i_b are both increased and the next value of each set is loaded for the next comparison. If the compared values are unequal, then only the next value of the sorted set with the smaller value is loaded and compared with the current value of the other set. The algorithm finishes when there is no next value in one of the two sets.

In the above scalar sorted-set intersection algorithm example, the worst-case number of comparisons for intersecting sorted sets A and B is l_a+l_b−1. The worse case occurs when sorted sets A and B have no common value, while the best-case number of scenarios is only the minimum of l_a and l_b. The scalar sorted-set is inefficient since it compares one value of each sorted set in each iteration up to l_a+l_b−1 comparisons. Thus, there is a need for an approach for sorted-set intersection that compares multiple values in each input sorted set simultaneously in each iteration.

Conflict-Detection SIMD Instruction Overview

SIMD architectures allow computers with multiple processing elements to simultaneously perform the same operation on multiple data points. SIMD architectures may perform "vertical" instructions, where corresponding elements in separate operands are operated upon in parallel and independently, or "horizontal" instructions, where operations are performed across the elements of a SIMD register.

Horizontal SIMD instructions possess a subclass of conflict-detection SIMD instructions that finds values in an input vector that appear twice or more. The instruction then creates a vector that stores the values that appear twice or more as well as the locations of the duplicate values. The VPCONFLICTD instruction is one example for such instructions.

SIMD instructions allow the execution of the same operation on multiple data elements at once. In one embodiment, values of two or more sorted sets are loaded into a single vector so that conflict-detection SIMD instructions are applied on the vector in order to find the common values within the two or more sorted sets.

An improvement caused by the approach of using conflict-detection SIMD instructions to perform sorted-set intersection includes fewer iterations compared to scalar sorted-set intersection algorithms and, due to the all-to-all comparison of values via SIMD comparison instructions, fewer number of comparisons of values in each sorted set.

AVX-512 Instruction Overview

A vectorized sort-set intersection algorithm that uses conflict-detection SIMD instructions may be used to perform sort-set intersection. In some embodiments, the vectorized sorted-set intersection algorithm is run on CPUs that support SIMD instructions sets that include conflict-detection SIMD instructions. In one embodiment, the vectorized sorted-set algorithm is run on CPUs that support an AVX-512 SIMD instruction set.

AVX-512 is an SIMD instruction set introduced by the INTEL CORPORATION. The AVX-512 SIMD instruction set has 512-bit vector operation capabilities. 512-bit specifically refers to the width of the register which sets the parameters for how much data a set of instructions can operate on at a time. For example, a vectorized sorted-set intersection algorithm that uses the AVX-512 SIMD instruction set may operate on eight 64-bit integers, or sixteen 32-bit integers within 512-bit vectors at a time. Thus, a vectorized sort-set intersection algorithm that uses an AVX-512 SIMD instruction set may natively support 32-bit and 64-bit integer values.

The _mm512_mask_loadu_epi32 AVX-512 SIMD instruction may be used to load values from memory and combine them with values from another vector to create a new vector. For example, the _mm512_mask_loadu_epi32 instruction may be used to create a vector that holds values from two or more input sorted sets.

The _mm512_conflict_epi32 AVX-512 SIMD instruction is a conflict-detection instruction that may be used to identify values in an input vector that appear more than once. The instruction may also be used to create a result vector that stores the values appear more than once and the locations of the duplicate values. Thus, the _mm512_conflict_epi32 instruction may be used to identify common values common values (i.e., the intersection) within two or more input sorted sets. For example, in a vector holding 8 distinct values from a first sorted set and 8 distinct values from a second sorted set, the _mm512_conflict_epi32 conflict-detection instruction may be applied to the vector to identify all common values between the 8 distinct values from the first sorted set and the 8 distinct values from the second sorted set.

The _mm512_mask_compressstoreu_epi32 AVX-512 SIMD instruction may be used to write back a vector's values into memory. Specifically, the instruction takes a vector and a bitmask as inputs and writes back into memory the vector's values that have bits set in the input bitmask. The values that are written back into memory may be stored contiguously in memory.

Vectorized Sorted-Set Intersection Implementation Overview

The following discussion describes how to use conflict-detection SIMD instructions to perform sorted-set intersection that is significantly faster compared to scalar sorted-set intersection. The vectorized sorted-set intersection algorithm of the present invention works for various conflict-detection SIMD instructions.

In an embodiment, an iteration in the vectorized sorted-set intersection algorithm has four main phases: 1) loading subsets of values from two sorted sets into a single vector, 2) find common values in the single vector from the sorted sets using a conflict-detection SIMD instruction, 3) write the common values into a result set, and 4) updating one or both indices that point to the current sorted subsets.

TABLE 2

Pseudo code for an example vectorized sorted-set intersection algorithm

```
int simd_intersect(SortedSet s1, SortedSet s2, SortedSet * so) {
    _m512i *a_cur = (_m512i *) ((unsigned *) s1.data);
    _m512i *b_cur = (_m512i *) ((unsigned *) s2.data - K/2);
    _m512i *a_end = (_m512i *) a_cur + s1.length / K;
    _m512i *b_end = (_m512i *) b_cur + s2.length / K;
    unsigned *out = (unsigned *) so->data;
    _m512i vec_ts = _mm512_set1_epi32(0xFFFFFFFF);
    _mmask16 mask = _cvtu32_mask16(0xFF00);
    while(a_cur < a_end && b_cur < b_end) {
        // 1. Create a vector with values from both sets
        _m512i vec_val , vec_conf;
        vec_val = _mm512_loadu_si512(a_cur);
        vec_val = _mm512_mask_loadu_epi32(vec_val, mask, b_cur);
        // 2. Find conflicts in the vector, i.e., common values
        vec_conf = _mm512_conflict_epi32(vec_val);
        _mmask16 cf = _mm512_test_epi32_mask(vec_conf , vec_ts);
        // 3. Write back common values
        _mm512_mask_compressstoreu_epi32(out, cf, vec_conf);
        out += _mm_popcnt_u32(_cvtmask16_u32(cf));
```

TABLE 2-continued

Pseudo code for an example vectorized sorted-set intersection algorithm

```
    // 4. Advance in one or both sets
    unsigned *a_cur_s = (unsigned *) a_cur;
    unsigned *b_cur_s = (unsigned *) b_cur;
    a_cur = (_m512i *) (a_cur_s + ((a_cur_s[K/2-1] <=b_cur_s[K-1]) *
    K/2));
    b_cur = (_m512i *) (b_cur_s + ((a_cur_s[K/2-1] >=b_cur_s[K-1]) *
    K/2));
  }
  return out - (unsigned *) so->data;
}
```

Table 2 illustrates pseudo code for an example vectorized sorted-set intersection algorithm. The example algorithm may be implemented in the simd_intersect( ) function which takes three (3) arguments: s1, s2, and so. The s1 and s2 arguments represent the two input sorted sets. The vectorized sorted-set intersection algorithm works for any number of input values. For purposes of illustration, foregoing examples of the vectorized sorted-set intersection algorithm will be restricted to intersecting two input sorted sets. However, it should be understood that any number of input sorted sets can be intersected. In some embodiments, the vectorized sorted-set intersection algorithm takes two or more input sorted sets represented by two or more arguments. The argument so holds the result set. The example algorithm finds common values within s1 and s2 and writes the common values back into result set so.

The simd_intersect( ) function starts by setting up variables that are used to iterate through the input sorted sets: a_cur and b_cur are pointers to the current vectors of the first sorted input set s1 and the second sorted input set s2, while a_end and b_end are pointers to the last vectors of the first and second input set. A pointer out is also set that is used to write back common values of both input sorted sets into memory. The vector vec_ts holds the value 0xFFFFFFFF and is used to find conflicting values (i.e., common values) in the main loop of the example algorithm.

The vector width is represented by the value of K. In an embodiment, the vectorized sorted-set intersection algorithm iterates over two sorted sets in a certain step size. In each iteration, the algorithm compares n number of values from the first sorted set with m number of values from the second sorted set, where n+m=K. The values of n and m may depend on the domain and number of values of both sorted sets. For example, if the domain of one sorted set is much larger than the domain of the second sorted set, then n should be greater than m.

The bitmask mask holds a value that is used to control how many values are loaded into the vector from each input sorted set. In some embodiments, the value of mask is represented in hexadecimal numbers.

TABLE 3

Example values of mask where the vector width (K) is 16

| Value of mask | Number of values (n) from the first sort set (s1) | Number of values (m) from the second sort set (s2) |
|---|---|---|
| 0x8000 | 15 | 1 |
| 0xC000 | 14 | 2 |
| 0xE000 | 13 | 3 |
| 0xF000 | 12 | 4 |
| 0xF800 | 11 | 5 |
| 0xFC00 | 10 | 6 |

TABLE 3-continued

Example values of mask where the vector width (K) is 16

| Value of mask | Number of values (n) from the first sort set (s1) | Number of values (m) from the second sort set (s2) |
|---|---|---|
| 0xFE00 | 9 | 7 |
| 0xFF00 | 8 | 8 |
| 0xFF80 | 7 | 9 |
| 0xFFC0 | 6 | 10 |
| 0xFFE0 | 5 | 11 |
| 0xFFF0 | 4 | 12 |
| 0xFFF8 | 3 | 13 |
| 0xFFFC | 2 | 14 |
| 0xFFFE | 1 | 15 |

Table 3 illustrates example mask values where the vector width K is set to 16. For example, a mask value of 0x8000 loads 15 values from the first sorted set s1 and 1 value from the second sorted set s2 while a mask value of 0xFFFE load 1 value from the first sorted set s1 and 15 values from the second sorted set s2. In the above example vectorized sorted-set intersection algorithm, the mask value is set to 0xFF00 which corresponds to loading 8 values from both the first sorted set s1 and 1 value from the second sorted set s2. The example values in Table 3 are provided for purposes of illustration and are not meant to be limiting. It should be understood in practice that these values may vary and can be other than the values depicted in the Table 3. Further, the values of the mask may be in various different data formats.

Returning to the example vectorized sorted-set intersection algorithm in Table 2, the main loop of the example algorithm runs until the last vector of one of the input sorted sets is reached and performs the following steps.

First, the example algorithm creates a single vector vec_val with values from input sorted set s1 and input sorted set s2. SIMD load instructions are used to load values from both input sorted sets. The _mm512_loadu_si512 SIMD load instruction is used to load the vector vec_val using vector width K with values from the first sorted set s1. For example, if vector width K=16, vec_val is filled with 16 values from the first sorted set s1. The mm512_mask_loadu_epi32 AVX-512 SIMD load instruction is then used to load the vector vec_val with values from the second sorted set s2. The _mm512_mask_loadu_epi32 instruction loads values from the second sorted set s2 and overwrites the K−m last values in the vector vec_val with values of the second sorted set s2, where n+m=K and n is the number value loaded from of the first sorted set and m is the number values loaded from the second sorted set. The number of values overwritten by _mm512_mask_loadu_epi32 is determined by the bitmask mask.

Next, the example algorithm identifies conflicts (i.e., common values) in the vector vec_val using the conflict-detection _mm512_conflict_epi32 AVX-512 SIMD instruction. The conflicts are stored in the vector vec_conf which is used to create a bitmask cf which has a bit set for each value that appears twice in the vector vec_val.

The conflicts (i.e., common values) are written back into memory using the _mm512_mask_compressstoreu_epi32 SIMD instruction. The _mm512_mask_compressstoreu_epi32 instruction takes the bitmask cf indicating which values of a vector should be written back and writes them continuously in memory using the pointer out. The pointer out is then incremented using the number of conflicts (i.e., common values) obtained via a population count instruction _mm_popcnt_u32.

The example algorithm determines whether to advance the one or both pointers to the current vectors of the input sorted sets. If the last elements of both vectors are equal, then both pointers are advanced. Otherwise, only the pointer to the vector of the sorted set that has the smaller of both last vector elements is advanced. The example algorithm finishes when there is no next vector in at least one of the two input sorted sets.

In some embodiments, the vectorized sorted-set intersection algorithm does not write the common values back into a result vector into memory. In other embodiments, the vectorized sorted-set intersection algorithm returns a count of the number of common values in two or more input sorted sets. For example, the algorithm may set up a variable sum to hold the number of common values in the two or more sorted sets such that sum may be updated using the count instruction _mm_popcnt_u32 to obtain the number of set bits (i.e., common values) from bitmask cf.

The vectorized sorted-set intersection algorithm may be implemented via any programming language that utilizes container data structures including JAVA, C++, OBJECTIVE-C or any other suitable programming environment.

Process Overview

For the purpose of illustration, a clear example in FIGS. 1A-1E illustrate a vectorized sorted-set intersection algorithm using conflict-detection SIMD instructions according to an embodiment of the present invention. Referring to FIG. 1A, a vectorized sorted set intersection is performed on a first ordered set of values 100 and a second ordered set of values 120. In some embodiments, the vectorized sorted-set intersection algorithm works for any number ordered sets of values. For purposes of illustration, foregoing examples of the vectorized sorted-set intersection algorithm will be restricted to intersecting two input sorted sets. However, it should be understood that any number of ordered sorted sets of values can be intersected.

Register vector 130 stores values from the first ordered set of values 100 and the second ordered set of values 120, where register vector 130 has vector width K=16, number of values to be loaded from the first ordered set of values 100 in each iteration is n=4, and number of values to be loaded from the second ordered set of values 120 in each iteration is m=12. The first ordered set of values 100 includes subsets of values from the first ordered set of values 101-104. The second ordered set of values 120 includes a subset of values from the second ordered set of values 121. The example values in ordered sorted sets of values are provided for purposes of illustration and are not intended to be limiting. It should be understood that in practice the sizes and values may vary from ordered sorted set to ordered sorted set and can be other than the values depicted in the examples in FIGS. 1A-1E. Further, the values in the ordered sorted sets may be in various data formats including, strings, numbers, percentages, dates, etc.

FIG. 2 illustrates a flow diagram that depicts a process for vectorized sorted-set intersection using conflict-detection SIMD instructions in an embodiment of the invention. The process 200 may be performed in any processor containing SIMD instruction sets. For example, the x86 processor architecture allows the instructions to operate on an independent register set including registers, which contain eight 16-bit values being compared.

Referring to FIG. 2, at step 210, a register vector is loaded with a first subset of values from a first ordered set of values and a second subset of values from a second ordered set of values. For example, the register vector may be loaded with an n number of values from the first ordered set of values and an m number of values from the second ordered set of values. The register vector may be set to if a specific vector width. For example, the register vector width may be set to a specific value K, where K=n+m, thus, the vectorized sorted-set intersection algorithm supports advancing and comparing ordered sets of values with different speeds (e.g., advance the first ordered set of values by n and the second ordered set of values my m per iteration).

In one embodiment, an SIMD load instruction is used to load values from both ordered subsets of values. For example, an SIMD load instruction may first be used to load the register vector with all values from the first ordered set of values. The SIMD load instruction may then be used to load values from the second ordered set of values that overwrites the K−m last values in the register vector with values from the second ordered set of values, where n+m=K. The values in each ordered set of values may be stored as a register vector in a register of a processor. In an embodiment, the values in each ordered set of values are distinct. In another embodiment, the values in the subsets of values are also ordered.

Referring to the example illustrated in FIG. 1B, a first subset of values from the first ordered set of values 101 and a first subset of values from the second ordered set of values 121 are loaded into the register vector 130. In an embodiment, pointers are generated and used to indicate the current subsets of values from each ordered set of values that are being loaded into the register vector 130. After loading, register vector 130 includes a first set of loaded values 131 and a second set of loaded values 132. In the example illustrated in FIG. 1B, an n=4 number of values from the first ordered set of values 100 and an m=12 number of values from the second order set of values 120 are loaded into register vector 130. The register vector 130 in this example has a vector width of K=16, where K=n+m.

Returning to FIG. 2, at step 220, an SIMD operation is performed on the register vector that is loaded with the first subset of values from the first ordered set of values and the second subset of values from the second ordered set of values to identify the common values in the register vector. For example, in order to identify the common values in the register vector that holds values from both the first ordered set of values and the second ordered set of values, the SIMD operation may identify a first value in the register vector that matches another value in the register vector. In one embodiment, the SIMD operation performed on the register vector is a conflict-detection SIMD operation. In an embodiment, the conflict-detection SIMD operation is an AVX-512 SIMD conflict-detection instruction.

Figure 1C:
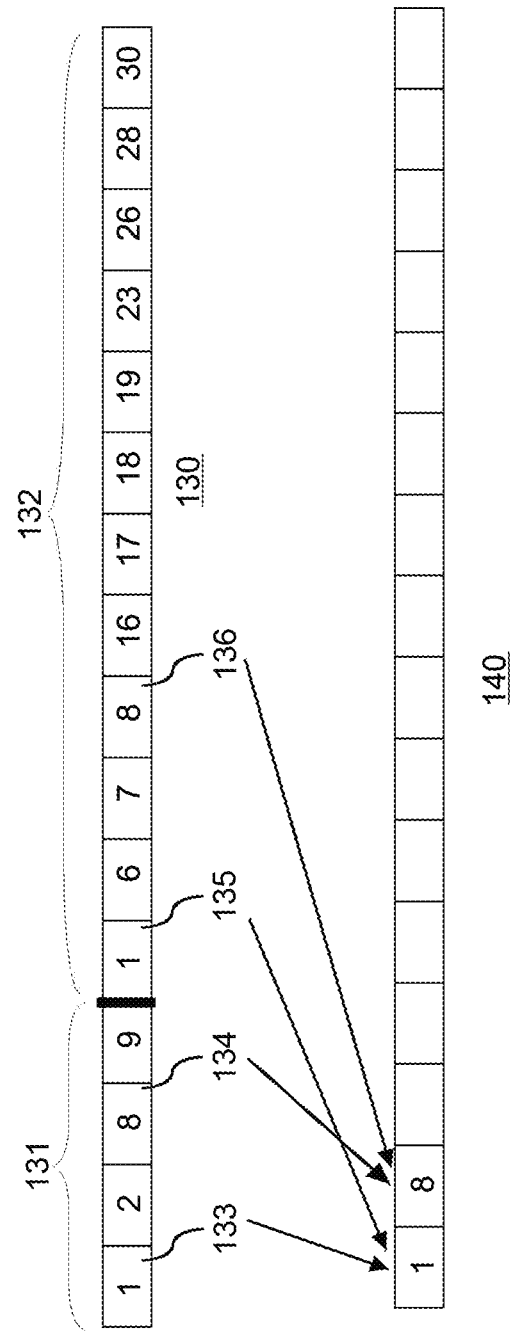

Referring to the example illustrated in FIG. 1C, register vector 130 is loaded with values from the first ordered set of values 100 and the second order set of values 120, where the first set of loaded values 131 includes values from the first ordered set of values 100 and the second set of loaded values 132 includes values from the second ordered set of values 120. An SIMD operation is performed on the register vector 130 to identify common values. For example, a conflict-detection SIMD instruction may be performed on register vector 130 to identify values in the first set of loaded values 131 that matches values in the second set of loaded values 132. In the example illustrated in FIG. 1C a conflict-detection SIMD operation performed on register vector 130 would be able to identify a first set of matching values 133 and 135, and a second set of matching values 134 and 136.

Returning to FIG. 2, at step 230, common values identified in the previous step 220 are stored in a result set, where the result set represents a merge-sort result set between the first ordered set of values and the second ordered set of values. In an embodiment, the values in the first ordered set of values are distinct and the values in the second ordered set of values are also distinct. In one embodiment, the values stored in the result set are ordered. In another embodiment, the common values stored in the result set is used to create a bitmask which has a bit set for each common value identified in the register vector. For example, a bitmask may be generated comprising a plurality of bits, where a bit within the bitmask is set to "1" for each value that matches another value in the register vector. In some embodiments, an SIMD compress instruction is used to store common values in the result set.

Referring back to the example illustrated in FIG. 1C, the conflict-detection SIMD operation performed on register vector 130 identified the first set of matching values 133 and 135, and the second set of matching values 134 and 136. The identified matching values (i.e., common values), are then written into and stored in result set 140. In this example, the identified common values are written into the result set 140 without changing the order the common values.

Returning to FIG. 2, at step 240, a determination is made as to whether to load additional subsets of values from one or both ordered sets of values into the register vector. In one embodiment, the determination of whether to load additional subsets of values from one or both ordered sets of values into the vector register is based on comparing the last values of the previously loaded subsets of values from the ordered sets of values. In some embodiments, a determination is made as to whether to advance the one or both pointers to the subsets of values from one or both ordered sets of values. If the last values of both subsets of values are equal, then both pointers are advanced. Otherwise, only the pointer to the subset of values of the ordered set of values that has the lesser of the last elements of the subsets of values is advanced.

Figure 1D:
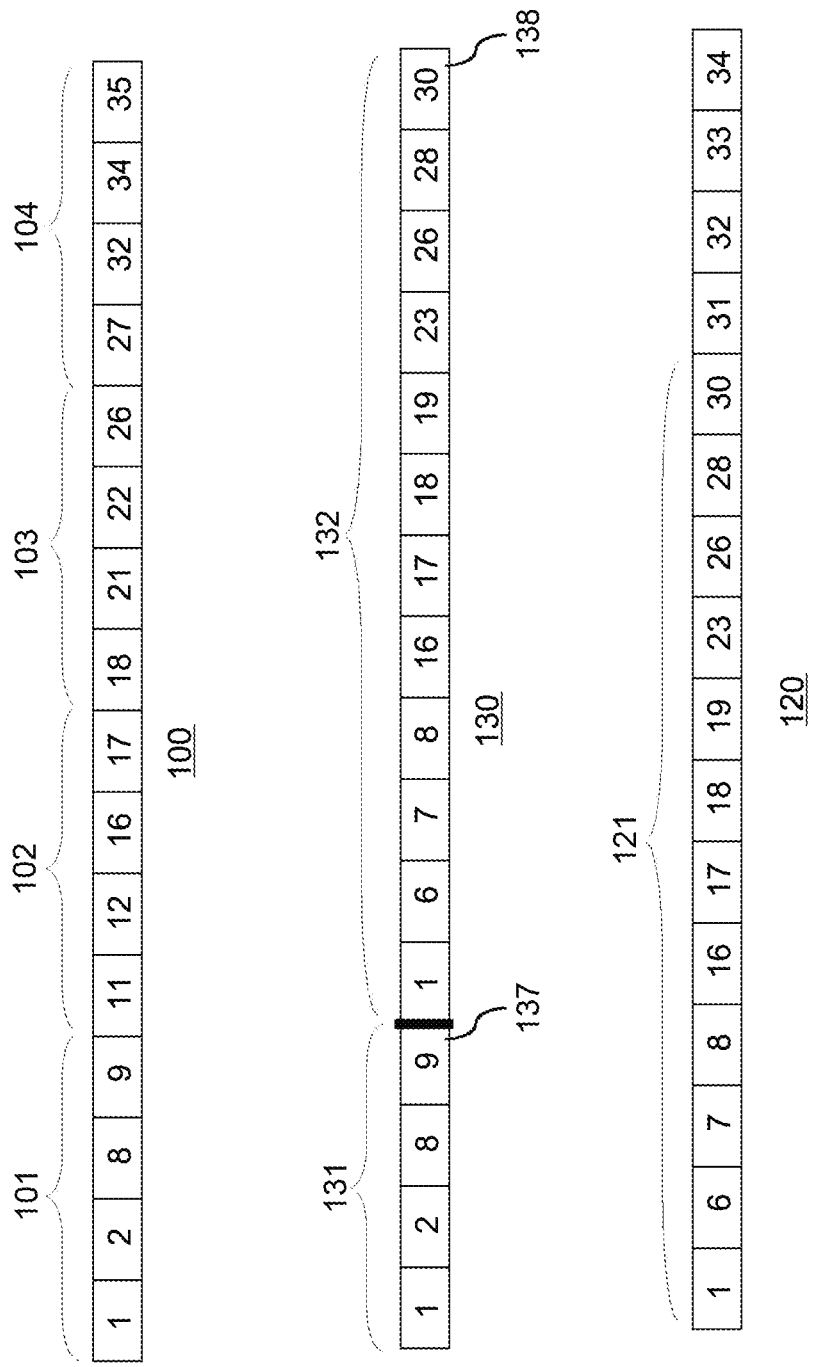

For example, referring to FIG. 1D, which illustrates register vector 130 that includes a first set of loaded values 131, that contains values from the first ordered set of values 100, and a second set of loaded values 132, that contains values from the second ordered set of values 120. The first set of loaded values 131 is loaded from a first subset of values from the first ordered set of values 101, and the second set of loaded values 132 is loaded from a first subset of values from the second ordered set of values 121. In order to determine whether to load additional subsets of values into register vector 130 from one or both of the first ordered set of values 100 and the second ordered set of values 120, a comparison of the last value of the first set loaded values 137 and the last value of the second set of loaded values 138 may be made.

In one embodiment, an additional subset of values from the ordered set of values that has the lesser of last values of previously loaded subsets of values is loaded into the register vector 130. For example, referring back to FIG. 1D, the last value of the first set loaded values 137 is the value "9" and the last value of the second set of loaded values 138 is the value "30". Since "9" is less than "30", and the value "9" is from the first set loaded values 137 that, in turn, is loaded from the first ordered set of values 100, an additional subset of values from the first ordered set of values 100 may then be loaded into register vector 130. In an embodiment, if the last values of the previously loaded subsets of values from the ordered sets of values are equal, then an additional subset of values from both ordered sets of values may be loaded into the vector register 130. In some embodiments, pointers are generated and used to identify and obtain the last values of previously loaded subsets of values.

Figure 1E:
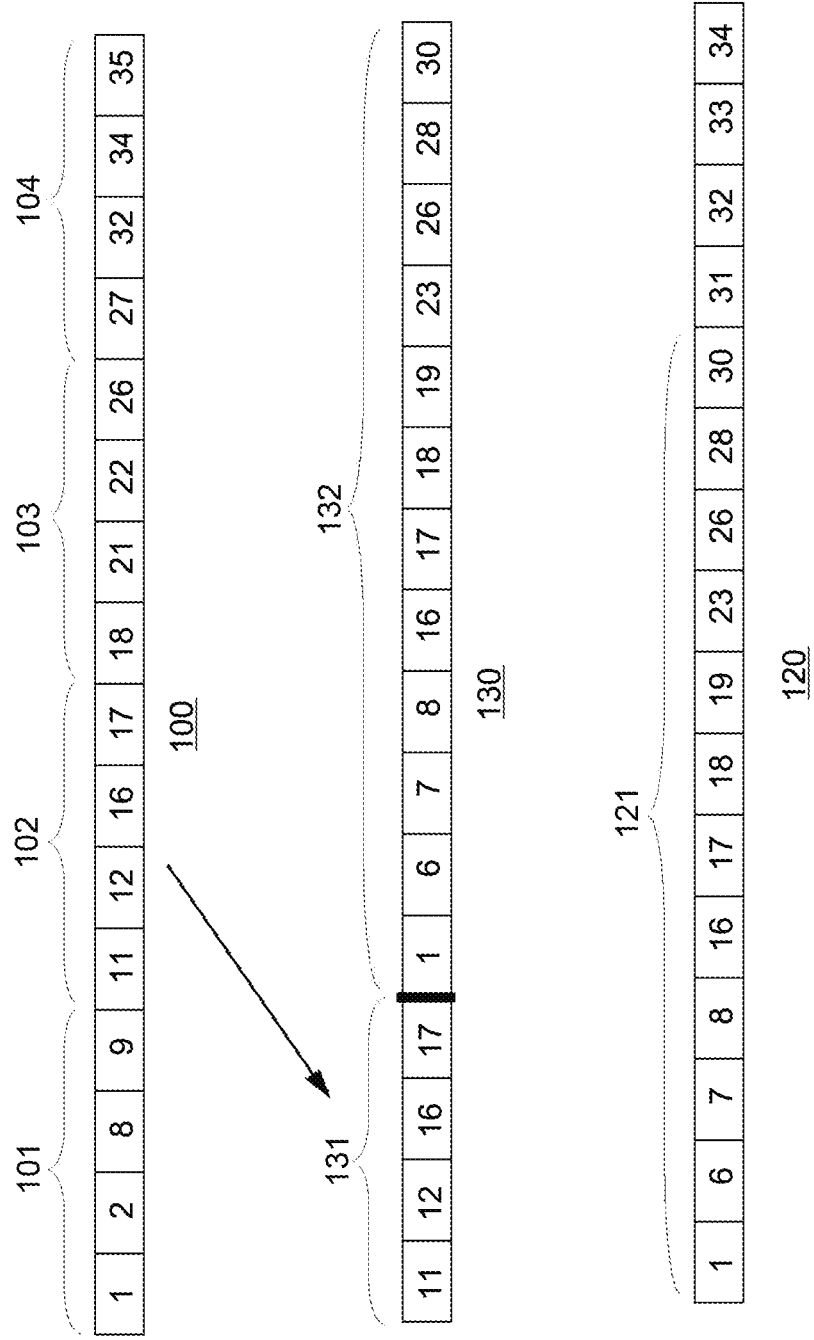

Referring to the example illustrated in FIG. 1E, in response to determining, in FIG. 1D, that the last value of the first set loaded values 137 is less than the last value of the second set of loaded values 138, a second subset of values from the first ordered set of values 102 is loaded into register vector 130.

Returning to FIG. 2, steps 210-240 are repeated for multiple iterations. In an embodiment, steps 210-240 are repeated until there are no next subsets of values to load from at least one of the two sets ordered sets of values.

At step 250, in response to determining that there are no additional subsets of values to load from at least one of the two sets ordered sets of values, returning the result set that contains the common values from the ordered sets of values. In one embodiment, the returned result set is stored contiguously within a memory address space of the memory. In some embodiments, a pointer is used to write back common values from the ordered sets of values into memory. In an alternative embodiment, the common values are not written back into a result set into memory. Instead, a count of the number of common values in the ordered sets of values may be determined. For example, an SIMD count instruction may be used to determine a number of set bits (i.e., common values) within the bitmask generated at step 230 of FIG. 2.

Benefits and Applications

Several experiments were conducted, showing that vectorized sorted-set intersection using conflict-detection SIMD instructions is superior over scalar sorted-set intersection approaches. In particular, the vectorized sorted-set intersection employs conflict-detection SIMD instructions to advantageously minimize the number of comparisons needed to find common values within two or more sorted sets. The following discusses the setup and outcome of these experiments.

Experiments were conducted on a system that comprises an Intel i3-8121U CPU with a core frequency of up to 3.20 GHz and 8 GB of main memory. The CPU supports the following AVX-512 instruction sets: AVX512F, AVX512CD, AVX512BW, AVX512DQ, AVX512VL, AVX512IFMA, and AVX512VBMI. The employed SIMD instruction set operate on the 512-bit registers of AVX-512. Linux (kernel version 4.4.0) was used as the operating system. The algorithms are implemented in C++ and were compiled using GCC 5.4.0.

Two scalar sorted-set implementations and the vectorized sorted-set intersection using conflict-detection SIMD instructions implementation were compared. The first scalar sorted-set intersection implementation uses branches in the main loop for maintaining indices while the second scalar sorted-set intersection implementation is optimized via a technique similar to predication and does not have branches in the main loop.

Before each experiment, datasets were generated that consisted of uniformly distributed values that varied in selectivity, where selectivity is defined as the fraction of the number of common values of both ordered sets and the cardinality of the smaller set. The selectivity was varied by altering the domain of the values, where a greater domain leads to smaller selectivity and vice versa.

Figure 3:
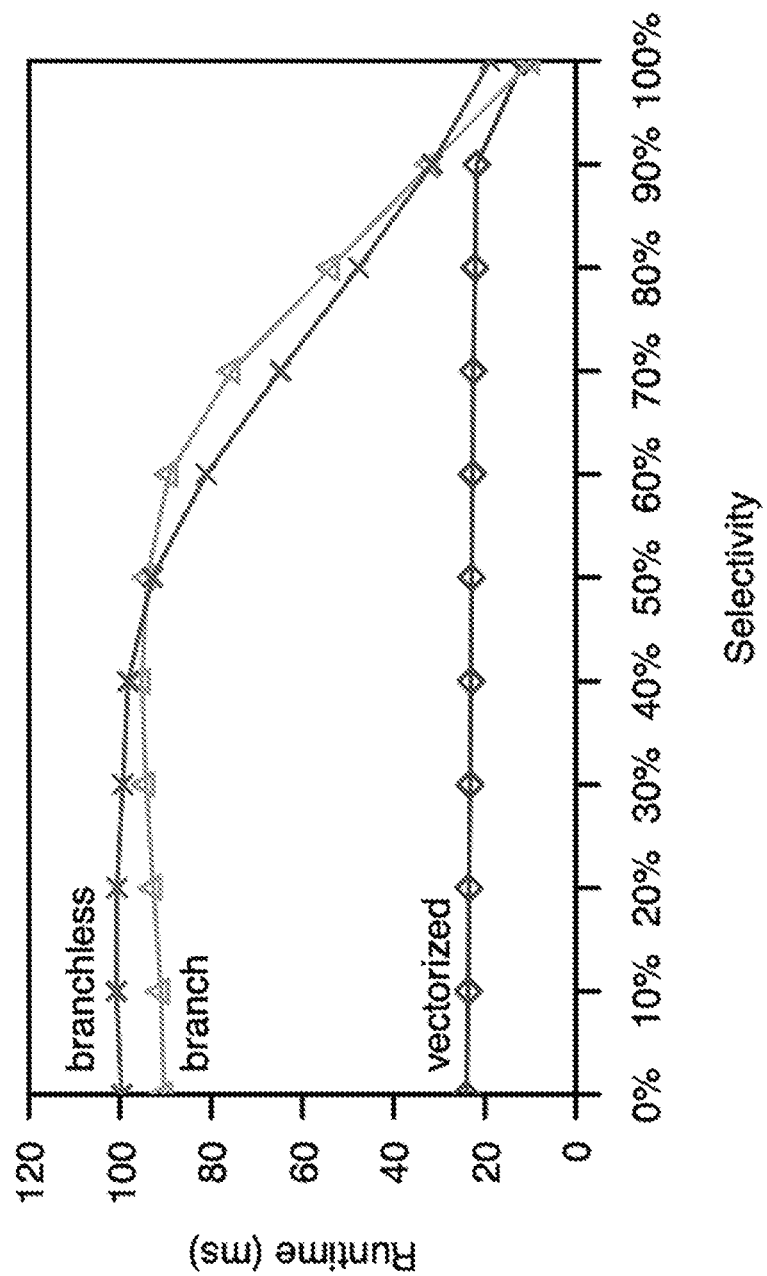
FIG. 3 illustrates a graph depicting performance comparison of the two scalar sorted-set implementations and the vectorized sorted-set intersection using conflict-detection SIMD instructions implementation in an embodiment of the invention.

FIG. 3 illustrates a graph depicting performance comparison of the two scalar sorted-set implementations and the vectorized sorted-set intersection using conflict-detection SIMD instructions implementation. As can be seen, vectorized sorted-set intersection using conflict-detection SIMD instructions is considerably faster than regular scalar sorted-set implementations for a wide array of selectivity. It is up to about 4× faster than scalar sorted-set implementations for selectivities below or equal to 50%. For higher selectivities, the vectorized sorted-set intersection using conflict-detection SIMD instructions implementation is on average 2× faster than scalar sorted-set implementations. Only for 100% selectivity, where both sorted sets are equal, the performance of the scalar sorted-set intersection implementation that uses branches is on par with the vectorized sorted-set intersection using conflict-detection SIMD instructions implementation. However, this is a special case that rarely happens in real-world applications.

Unlike existing sorted-set intersection implementations, the vectorized sorted-set intersection using conflict-detection SIMD instructions implementation also allows advancing in different speeds through two or more sorted sets and supports 32-bit and 64-bit values natively. This allows sophisticated iteration strategies for sorted sets with different sizes or different value domains. Furthermore, this implementation supports intersecting more than two sorted sets at a time and is beneficial for intersecting small sets with few elements (e.g., intersecting a sorted set with 60 values with a small sorted set with 4 values).

The vectorized sorted-set intersection using conflict-detection SIMD instructions can be implemented in a vast number of applications/products. Intersection, and in particular sorted-set intersection, is a fundamental operation and is used to some degree in almost all applications and systems. Especially, algorithms where intersection is responsible for a large fraction of an algorithm's overall runtime (certain queries and index creation in databases, various data mining algorithms, search index creation in information retrieval) would significantly benefit if the intersection algorithm is exchanged with the vectorized sorted-set intersection using conflict-detection SIMD instructions implementation. Hence, all companies (e.g., Facebook, Microsoft, SAP, IBM, Google, Amazon) that process large amounts of data might integrate the vectorized sorted-set intersection using conflict-detection SIMD instructions in their products and applications.

The vectorized sorted-set intersection using conflict-detection SIMD instructions can further be integrated into data structures and functions provided by various language libraries (e.g., std::set_intersection of the C++ standard template library). All programs using these data structures of these libraries would then automatically benefit of the vectorized sorted-set intersection using conflict-detection SIMD instructions. Similarly, vectorized sorted-set intersection using conflict-detection SIMD instructions could be integrated as a rule in just-in-time compilers, which then could detect and rewrite sort implementations during the runtime of a program. Even if the performance improvements are limited in programs that do not use intersection heavily, the cumulated performance improvements of the vast number of programs that benefit from the approach is substantial.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
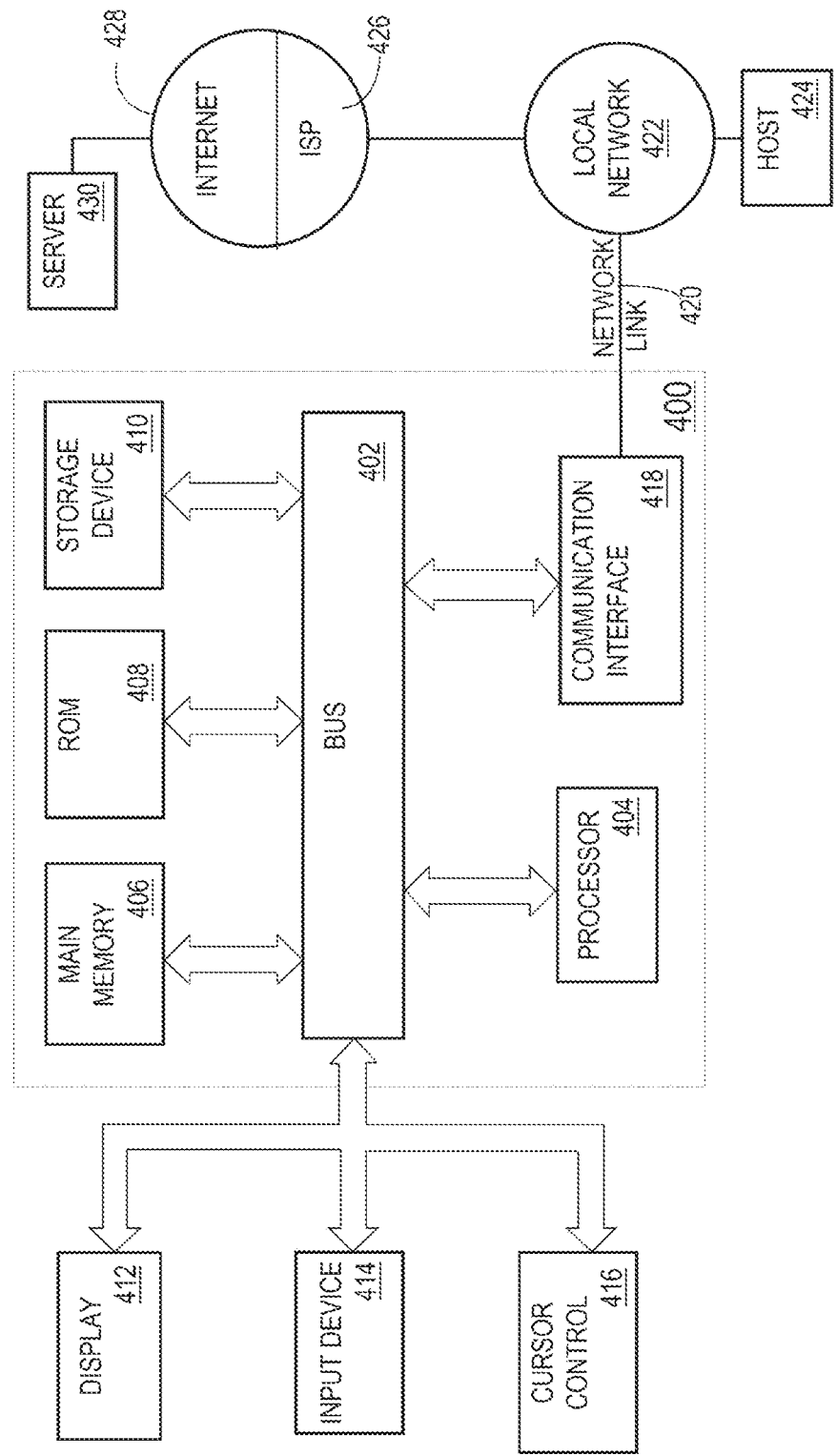
FIG. 4 illustrates a diagram depicting a computer system that may be used in an embodiment of the present invention.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
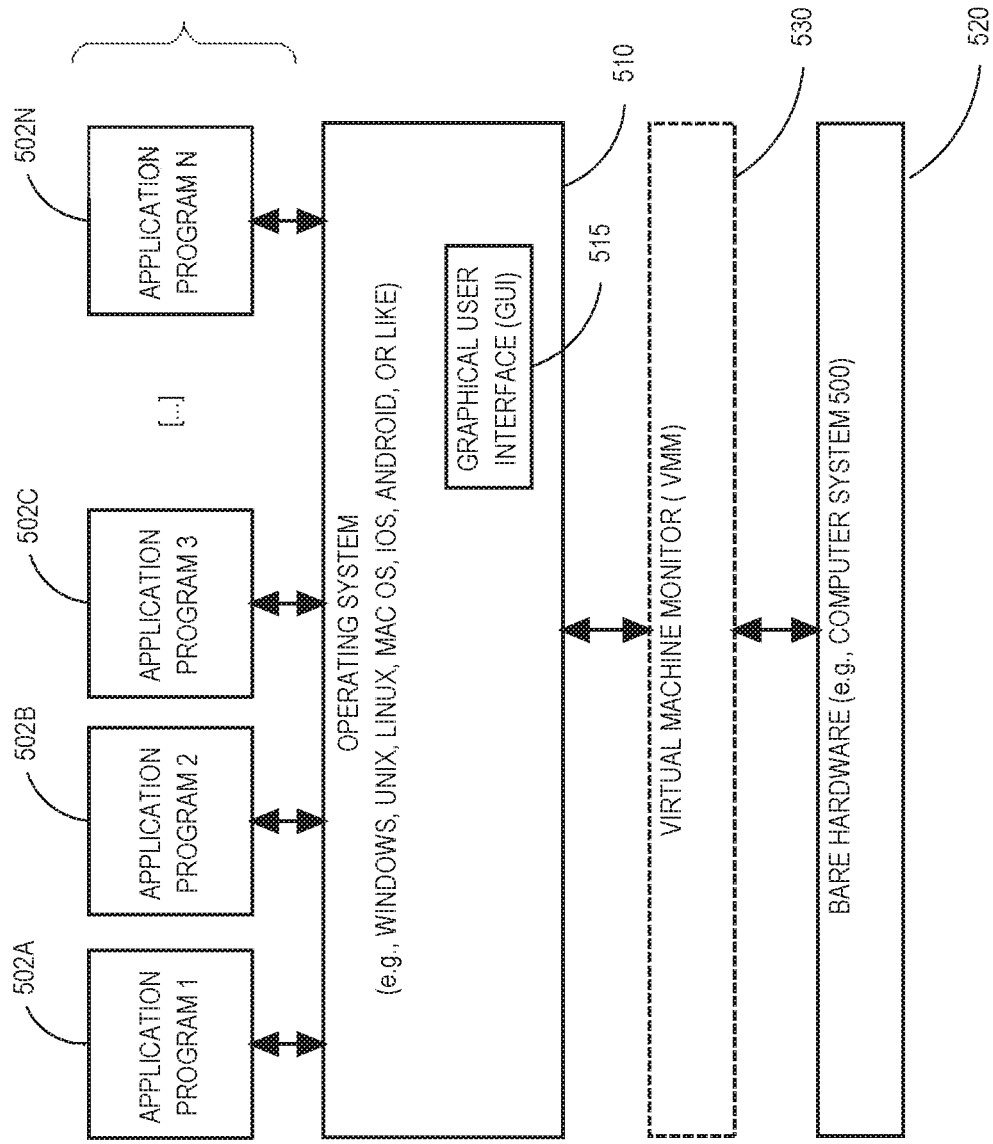
FIG. 5 illustrates a diagram depicting a software system upon which an embodiment of the invention may be implemented.

FIG. 5 is a block diagram of a software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 400. The applications or other software intended for use on system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of system 500. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method, comprising:
loading into a register a first ordered subset of distinct values of a first ordered set of distinct values and a second ordered subset of distinct values of a second ordered set of distinct values;
performing a single instruction, multiple data (SIMD) operation that identifies a first value in the register that matches another value in the register;
storing the first value in a result set representing a merge-sort result set between the first ordered set of distinct values and the second ordered set of distinct values.

2. The method of claim 1, further comprising:
comparing a last value of the first ordered subset of distinct values with a last value of the second ordered subset of distinct values;
in response to determining that the last value of the first ordered subset of distinct values is less than the last value of the second ordered subset of distinct values, loading into the register a third ordered subset of values of the first ordered set of distinct values.

3. The method of claim 1, further comprising:
comparing a last value of the first ordered subset of distinct values with a last value of the second ordered subset of distinct values;
in response to determining that the last value of the first ordered subset of distinct values is equal to the last value of the second ordered subset of distinct values, loading into the register a fourth ordered subset of values of the first ordered set of distinct values and a fifth ordered subset of values of the second ordered set of distinct values.

4. The method of claim 1, further comprising:
performing the SIMD operation that identifies a second value in the register that matches another value in the register.

5. The method of claim 1, further comprising:
generating a bitmask comprising a plurality of bits, wherein a bit within the bitmask is set for each value that matches another value in the register; and
executing a count instruction that determines a number of set bits within the bitmask.

6. The method of claim 1, further comprising:
loading into the register a sixth ordered subset of values of a third ordered set of distinct values.

7. The method of claim 1, wherein the result set is stored contiguously in a memory of computing device.

8. The method of claim 1, wherein the SIMD operation that identifies the first value in the register that matches another value in the register is a SIMD conflict-detection instruction.

9. The method of claim 1, wherein storing the first value in the result set comprises executing a SIMD compress instruction.

10. The method of claim 1, wherein loading into the register comprises executing a SIMD load instruction.

11. One or more non-transitory storage media storing sequences of instructions which, when executed by one or more processors, cause:
loading into a register a first ordered subset of distinct values of a first ordered set of distinct values and a second ordered subset of distinct values of a second ordered set of distinct values;
performing a single instruction, multiple data (SIMD) operation that identifies a first value in the register that matches another value in the register;
storing the first value in a result set representing a merge-sort result set between the first ordered set of distinct values and the second ordered set of distinct values.

12. The one or more non-transitory storage media of claim 11, wherein the sequences of instructions include instructions that, when executed by one or more processors, further cause:
comparing a last value of the first ordered subset of distinct values with a last value of the second ordered subset of distinct values;
in response to determining that the last value of the first ordered subset of distinct values is less than the last value of the second ordered subset of distinct values, loading into the register a third ordered subset of values of the first ordered set of distinct values.

13. The one or more non-transitory storage media of claim 11, wherein the sequences of instructions include instructions that, when executed by one or more processors, further cause:
comparing a last value of the first ordered subset of distinct values with a last value of the second ordered subset of distinct values;

in response to determining that the last value of the first ordered subset of distinct values is equal to the last value of the second ordered subset of distinct values, loading into the register a fourth ordered subset of values of the first ordered set of distinct values and a fifth ordered subset of values of the second ordered set of distinct values.

14. The one or more non-transitory storage media of claim 11, wherein the sequences of instructions include instructions that, when executed by one or more processors, further cause:

performing the SIMD operation that identifies a second value in the register that matches another value in the register.

15. The one or more non-transitory storage media of claim 11, wherein the sequences of instructions include instructions that, when executed by one or more processors, further cause:

generating a bitmask comprising a plurality of bits, wherein a bit within the bitmask is set for each value that matches another value in the register; and executing a count instruction that determines a number of set bits within the bitmask.

16. The one or more non-transitory storage media of claim 11, wherein the sequences of instructions include instructions that, when executed by one or more processors, further cause: loading into the register a sixth ordered subset of values of a third ordered set of distinct values.

17. The one or more non-transitory storage media of claim 11, wherein the result set is stored contiguously in a memory of computing device.

18. The one or more non-transitory storage media of claim 11, wherein the SIMD operation that identifies the first value in the register that matches another value in the register is a SIMD conflict-detection instruction.

19. The one or more non-transitory storage media of claim 11, wherein storing the first value in the result set comprises executing a SIMD compress instruction.

20. The one or more non-transitory storage media of claim 11, wherein loading into the register comprises executing a SIMD load instruction.

* * * * *

UNITED STATES PATENT AND TRADEMARK OFFICE
CERTIFICATE OF CORRECTION

PATENT NO. : 11,231,935 B2
APPLICATION NO. : 16/846773
DATED : January 25, 2022
INVENTOR(S) : Schlegel et al.

It is certified that error appears in the above-identified patent and that said Letters Patent is hereby corrected as shown below:

On the Title Page

On page 2, Column 1, Item (56) under Other Publications, Line 15, delete "ai.," and insert -- al., --, therefor.

In the Specification

In Column 2, Line 3, under TABLE 1, delete "1_a," and insert -- 1_a, --, therefor.

In Column 2, Line 3, under TABLE 1, delete "1_b," and insert -- 1_b, --, therefor.

In Column 2, Line 6, under TABLE 1, delete "1_a" and insert -- 1_a --, therefor.

In Column 2, Line 6, under TABLE 1, delete "1_b)" and insert -- 1_b) --, therefor.

In Column 3, Line 5, delete "count,—that" and insert -- count, —that --, therefor.

Signed and Sealed this
Seventeenth Day of May, 2022

Katherine Kelly Vidal
*Director of the United States Patent and Trademark Office*